US012537247B2

(12) United States Patent
Karlsson et al.

(10) Patent No.: US 12,537,247 B2
(45) Date of Patent: Jan. 27, 2026

(54) BATTERY CELL HAVING A PRISMATIC CONDUCTIVE HOUSING

(71) Applicant: Volvo Car Corporation, Gothenburg (SE)

(72) Inventors: Daniel Karlsson, Daniel Island, SC (US); Anna Öhrby, Gothenburg (SE); Peng Zhong, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 659 days.

(21) Appl. No.: 17/971,682

(22) Filed: Oct. 24, 2022

(65) Prior Publication Data

US 2023/0139645 A1 May 4, 2023

(30) Foreign Application Priority Data

Nov. 2, 2021 (EP) .................... 21206039

(51) Int. Cl.
*H01M 50/131* (2021.01)
*H01M 10/04* (2006.01)
(Continued)

(52) U.S. Cl.
CPC ....... *H01M 50/131* (2021.01); *H01M 10/049* (2013.01); *H01M 50/103* (2021.01); *H01M 50/169* (2021.01); *H01M 50/176* (2021.01); *H01M 50/505* (2021.01); *H01M 50/536* (2021.01); *H01M 50/55* (2021.01); *H01M 50/566* (2021.01); *H01M 2220/20* (2013.01)

(58) Field of Classification Search
USPC ....................................... 429/163
See application file for complete search history.

(56) References Cited

U.S. PATENT DOCUMENTS

| 5,549,717 A | 8/1996 | Takeuchi et al. |
| 2016/0133886 A1* | 5/2016 | Lim .................... H01M 50/176 |
| | | 429/179 |

(Continued)

FOREIGN PATENT DOCUMENTS

EP 31513050 A1 4/2017

OTHER PUBLICATIONS

Apr. 30, 2022 European Search Report issued in corresponding EP Application No. 21206039.

*Primary Examiner* — James M Erwin
(74) *Attorney, Agent, or Firm* — Clements Bernard Walker; Christopher L. Bernard

(57) ABSTRACT

A battery cell, suitable for use in an electric vehicle, includes a prismatic conductive casing having an electrically conductive casing body with a width (W), a height (H) and a thickness (T) and having a generally rectangular cross-section when seen in the thickness direction (z). A stack of layer assemblies is accommodated in the casing body, each layer assembly including a cathode layer, an anode layer and a separator layer there between, the layers extending in a width direction (x) and in a height direction (y) and being of a generally rectangular shape, a stack height extending in the thickness direction (z). The cathode and anode layers each include a cathode tab and an anode tab, respectively, one set of tabs extending in the width direction (x) along a lower part, substantially along the width (W) of the casing and being in conductive contact with a bottom of the casing.

19 Claims, 5 Drawing Sheets

(51) Int. Cl.
    *H01M 50/103*     (2021.01)
    *H01M 50/169*     (2021.01)
    *H01M 50/176*     (2021.01)
    *H01M 50/505*     (2021.01)
    *H01M 50/536*     (2021.01)
    *H01M 50/55*     (2021.01)
    *H01M 50/566*     (2021.01)

(56) References Cited

U.S. PATENT DOCUMENTS

| | | | |
|---|---|---|---|
| 2017/0098802 A1* | 4/2017 | Lee | H01M 50/55 |
| 2018/0108934 A1* | 4/2018 | Brenner | H01M 50/103 |
| 2018/0351139 A1* | 12/2018 | Muroya | H01M 50/103 |

* cited by examiner

BATTERY CELL HAVING A PRISMATIC CONDUCTIVE HOUSING

CROSS-REFERENCE TO RELATED APPLICATION

The disclosure claims the benefit of priority of co-pending European Patent Application No. 21206039.6, filed on Nov. 2, 2021, and entitled "Battery Cell Having a Prismatic Conductive Housing," the contents of which are incorporated in full by reference herein.

TECHNICAL FIELD

The disclosure relates to a battery cell with a prismatic casing having a generally rectangular cross-section when seen in the thickness direction, a stack of layer assemblies each including a cathode layer, an anode layer and a separator layer there between, the layers extending in a width direction and in a height direction and being of a generally rectangular shape, a stack height extending in the thickness direction, each layer assembly including a cathode tab and an anode tab. The disclosure further relates to an electric vehicle including such a battery cell and to a method of manufacturing.

BACKGROUND

Battery powered electric vehicles (BEVs) run on stored electricity in a battery pack that contains arrays of cells that have to be recharged once the charge is depleted. Car owners and drivers value a short stop at the charging station. During charging, transfer losses are increased significantly due high currents. As the generation of heat during recharging can be limited by reducing the current, charging times are extended.

Heat can be removed from the cells while charging using the battery pack's built-in active cooling system. Extracting heat keeps cell temperatures down, making it possible to run on higher amps for a period of time, in the end shortening charging time. Ultimately, the amount of time a customer will spend at the charging station is mainly determined by heat losses from the cell internal resistance and heat extraction by the active cooling system.

A cylindrical battery is known, including a conductive casing containing a so-called jelly roll stack of anode and cathode sheets with a separator layer in between. The battery cell is of a conductive can design in which the entire can forms a terminal. The jelly roll anode has folded internal tabs, arranged in a flower-like pattern. The anode material goes through a slitting machine to be cut, creating several small tabs. The three layers are subsequently fed though a winding machine and the internal tabs take on an overlapping configuration in the bottom plane of the jelly roll. The jelly roll is then inserted into the can with the anode side facing down, allowing a direct contact and electrical connection between the many tabs and the can such that each tab is capable of carrying electrical current from the anode substrate to the can.

Integrating the cylindrical batteries into a battery pack requires a dedicated design of the battery pack for maintaining the cylinders in their proper position, such as a pre-fabricated matrix structure into which the cells are inserted and fixed in position. A similar end-effect may be obtained by using fixtures, pick and place of the cells and subsequent potting operations. Furthermore, integration of cylindrical batteries into a rectangular-shaped battery pack is less efficient from a volumetric point of view and leaves a relatively large amount of volume unoccupied by the batteries.

It is an object of the present development to provide a battery cell for use in an electric vehicle that allows fast charging with reduced heat development. It is another object to provide a battery cell that is of a relatively simple and light-weight design and can be fitted efficiently in a battery pack a with a rectangular-shaped footprint. It is another object of the present development to provide for an effective method of manufacturing a battery cell.

SUMMARY

A battery cell according to the disclosure includes a prismatic conductive casing having an electrically conductive casing body with a width (W), a height (H) and a thickness (T) and having a generally rectangular cross-section when seen in the thickness direction (z), a stack of layer assemblies accommodated in the casing body, each layer assembly including a cathode layer, an anode layer and a separator layer there between, the layers extending in a width direction (x) and in a height direction (y) and being of a generally rectangular shape, a stack height extending in the thickness direction (z), the cathode and anode layers each including a cathode tab and an anode tab, respectively, one of the cathode tabs and anode tabs extending in the width direction (x) along a lower side of the stack (of layer assemblies, substantially along the width (W) of the casing and being in conductive contact with a bottom of the casing, a conductive cover being attached to the casing body and defining a top plane of the battery cell, a first terminal being situated at or near the top plane, conductively connected to the cover, the other of the cathode tabs and anode tabs extending in the width direction (x) along a section of an upper side of the stack of layer assemblies, and being connected to a conductor, the conductor extending via an opening in the cover to at or near the top plane and connected to the cover via an insulator member forming a second terminal at or near the top plane of the cell.

The battery cell according to the application is of a prismatic shape with a rectangular bottom surface that can be closely stacked in arrays forming a battery pack, for instance forming a structural battery.

The lower tab arrangement in electrical contact with the cell casing provides for an effective electrical pathway. When an electron is either emitted or absorbed to one of the substrate layers (anode or cathode) it only has to travel a distance (y) through the sheets and along the conductive bottom of the casing body. Via the conductive casing body, the electrons are conducted in the width direction (x) to or from a side surface of the cell casing and along the side surface in the height direction (y) through a side wall of the casing body. At the conductive cover, the electrons travel to an anode or a cathode terminal. The shortened distance from the point of electron emission (or absorption) inside a substrate to cell exit (or entry) at the terminals, located on the cell top-side, results in reduced heat losses since electrical losses are a function of distance and resistance.

In the present development, the prismatic conductive housing acts as a current collector, so that no separate current collector is required. Electrons can travel across any conductive housing face in a distributed manner, to find the shortest path to the anode or cathode terminal. Current flows in a distributed manner over the entire conductive housing. This results in a more even temperature distribution and lowers the overall temperature of the battery cell.

The battery cell of the present disclosure does not include a separate current collector, thus simplifying the manufacturing process and reducing cost.

The cathode tabs or anode tabs may be placed in electrically conductive contact and in heat conducting contact with the bottom of the casing. It is favorable to contact those tabs in which most heat is generated with the conductive casing bottom.

In a battery cell, the cathode tabs may extend along the lower side of the stack of layer assemblies, the first terminal forming a cathode terminal, the anode tabs extending along the upper side of the stack of layer assemblies, the conductor including an anode conductor and the second terminal forming an anode terminal.

A spacer member may be placed between a bottom part of the stack of layer assemblies and the bottom of the casing, the spacer member extending in the width direction (x) along the cathode tabs or the anode tabs.

The spacer member positions the stack of anode and cathode layers at a defined distance from the bottom of the casing. The tab layers may extend in a straight configuration in abutting contact with the bottom.

When the top cover is loaded during application of a downward force upon welding of the cover to the body of the housing, and/or during welding of the anode and/or cathode terminals to the tabs, the spacer prevents the internal tabs from being over compressed. The spacer also prevents excessive loads acting on the tabs as the electric vehicle moves up and down during driving conditions.

Two or more stacks of layer assemblies can be placed in the casing, side by side in the thickness direction (z), the anode tabs and/or the cathode tabs being fused together to form a fused tab assembly, a spacer member running alongside each fused tab assembly.

The anode and cathode sheets may be arranged in stacks or in a "jelly roll" configuration. The anode sheets may for instance have a thickness of 150 micrometer and the anode sheets in each layer may have a thickness of about 120 micrometer, while the separator layer may be 12 micrometer in thickness. Each stack may include between 160 and 170 layer assemblies. The cathode tabs and anode tabs of each layer assembly may be fused together, for instance through vibration welding, to form a fused tab assembly. The fused tabs may have a thickness of about 2 mm-10 mm and may have a height of between 2 mm and 20 mm.

Several stacks of sheets may be accommodated in the housing, side by side. Each fused tab assembly at the lower side of each stack is flanked on both sides by a spacer member at the bottom of the casing to maintain the fused tabs in their defined and controlled configuration and to prevent buckling.

In a battery cell, the second terminal may include a circumferential wall of isolating material, extending in the height direction (y) through a hole in the cover, the circumferential wall having an inner rim with a contact surface in a plane substantially transverse to the height direction (y), onto which plane superposed cathode tabs or anode tabs are welded in a lap joint.

The cathode tabs at the upper side of the stack of cathode and anode sheets, are bent and welded onto the contact surface by exerting a downward pressure in the height direction (y) to form a fused joint. The circumferential wall with the welded tabs may be attached to the cover to form a pre-assembly. The pre-assembled stack and cover may then be combined with the casing body that receives the stack of sheets, after which the cover is welded in place.

The second terminal includes a support wall may be situated parallel to the top plane and having an outer edge that abuts against the casing body and in inner edge, the circumferential wall extending in the height direction (y) from the support wall at the inner edge, the cover being welded to the casing body while pressing down onto the support wall. The terminal is positioned in the plane of the cover by abutting against the sidewalls of the housing. After welding in position, the cover clamps the terminal firmly in place in the height direction onto the stack of layer assemblies that is supported by the spacer members.

In a battery cell, the second terminal may include a conductive terminal cap that is welded on top of the superposed cathode tabs or anode tabs.

The terminal cap clamps the tabs against the contact surface and forms a conducting and protective seal over the tabs.

The anode tabs or cathode tabs (51, 51') may be welded to a perimeter of an elongate bus bar member (52) of a conductive material.

The tabs extend in the height direction (y) and are welded against the peripheral side of the bus bar member.

The bus bar member may have at a top surface a cylindrical part extending in the height direction (y), the cover including a hole in its top surface in which an isolating part is situated with an opening placed around the cylindrical part, placed over the bus bar member in the height direction, and having a peripheral rim that positions a cathode or anode conductor.

A method of manufacturing a battery cell with a prismatic conductive casing having width (W), a height (Y) and a thickness (Z) and having a generally rectangular cross-section when seen in the thickness direction (z), includes: placing a spacer member at a bottom of a casing body, placing a stack (of layer assemblies each including a cathode layer, an anode layer and a separator layer there between, the stack including cathode tabs and anode tabs and being of a generally rectangular shape, in the casing body, such that the layers extend in a width direction (x) and in a height direction (y), a stack height extending in the thickness direction (z), placing one of the anode tabs and the cathode tabs that extend along a lower side of the stack of layer assemblies, substantially along the width (W) of the casing, and alongside the spacer member in conductive contact with the bottom, the other of the anode tabs and cathode tabs being situated along an upper side, welding the tabs at the upper side to a contact member of a terminal, and attaching a conductive cover to the casing body, the cover having an opening through which the contact member projects in the height direction, while exerting a compressive force in the height direction, clamping the contact member between the cover and the top of the stack of layer assemblies.

The one or more spacer members allow rapid an effective positioning of the tabs at the lower side of the stack. The terminal may be welded to the tabs and connected to the conductive cover to form a pre-assembly. After the stack is lowered into the casing body while placing the cover onto the body, the terminal is clamped between the cover and the top surface of the layer assemblies. The cover is sealed onto the casing body while the lower tabs are positioned in conductive contact with the casing bottom via the one or more spacer members.

The contact member may a circumferential wall having an inner rim with a contact surface in a plane substantially transverse to the height direction (y), the tabs at the upper side being superposed onto the contact surface and are welded in a lap joint condition by exerting a compressive force on the tabs in the height direction (y).

The tabs are folded onto the contact member and welded firmly in place by the compressive force exerted by the welding tool.

A conducting cap may be welded onto the tabs at the upper side by exerting a compressive force in the height direction (y).

BRIEF DESCRIPTION OF THE DRAWINGS

Embodiments of battery cell will by way of non-limiting example be described in detail with reference to the accompanying drawings. In the drawings.

DETAILED DESCRIPTION

Figure 1:
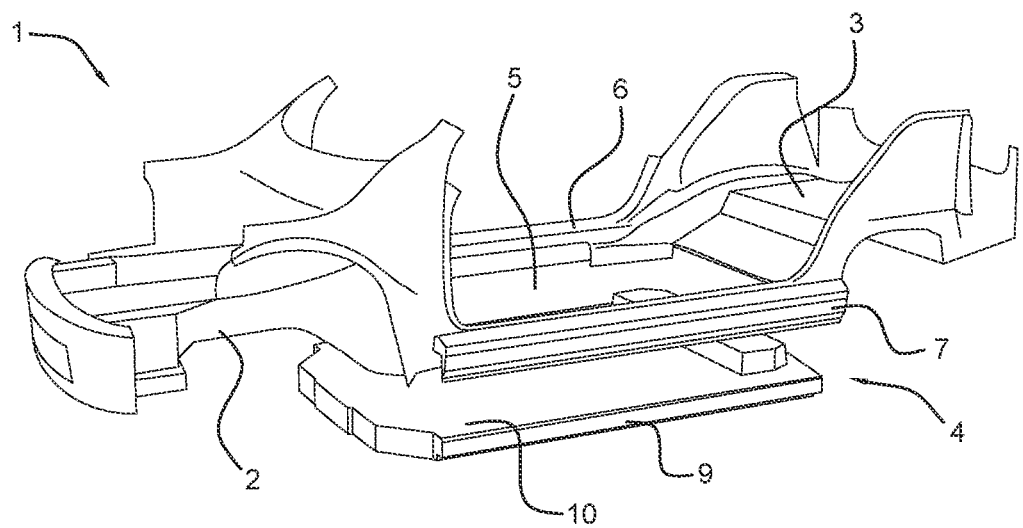
FIG. 1 shows a battery pack formed of prismatic battery cells with a rectangular-shaped bottom surface, connected to a front and rear frame part of an electric vehicle.

FIG. 1 shows a frame 1 of an electric vehicle, including a front frame structure 2, a rear frame structure 3, including a rear floor, and a structural battery pack 4, forming a bottom structure 5 of the vehicle. The structural battery pack 4 includes longitudinal sill profiles 6, 7 that interconnect the front and rear frame structures 2, 3 and that support a number of rows of interconnected prismatic battery cells 9. The top plate 10 of the battery pack 4 forms the bottom of the cabin of the vehicle.

Figure 2:
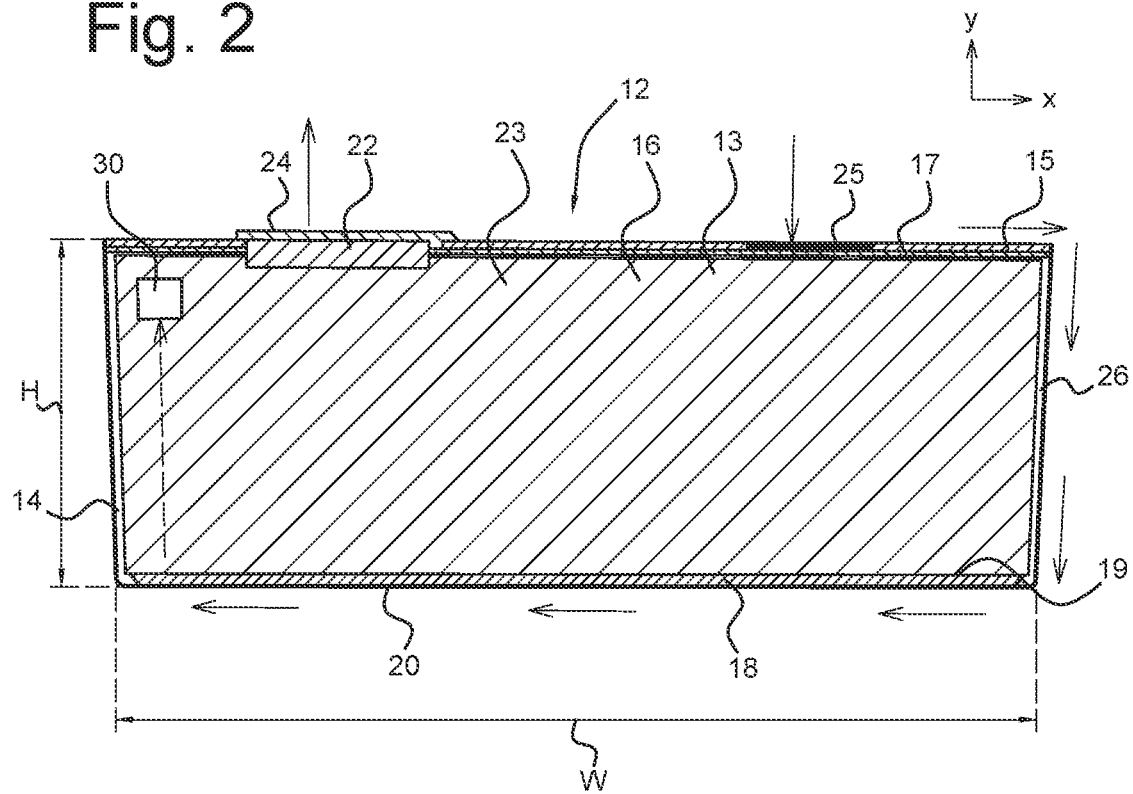
FIG. 2 shows a cross-sectional side view of a battery cell according to the disclosure, in the thickness direction.

FIG. 2 shows a cross-sectional view of a prismatic battery cell 12, for instance an electrochemical Lithium-ion battery cell, with a rectangular cross-section and a rectangular-shaped footprint, having a width W of for instance 286 mm, a height H of 110 mm and a thickness T of 30 mm. The battery cell 12 includes a casing 13 with a conductive casing body 14 and a conductive cover 15, for instance made of aluminum.

The casing 13 accommodates one or more stacks 16 of layer assemblies, each layer assembly including an anode layer, a cathode layer and a separator (isolation) layer, interposed between the anode and cathode layers. The layer assemblies extend in the x- and y directions in the plane of the drawing, and are stacked in a direction perpendicular to the plane of the drawing. Each stack 16 may include 160 or more layer assemblies in a z-stacked or jelly roll configuration.

Each stack 16 includes cathode tabs 18 extending along a lower part 19 of the stack. The cathode tabs 18 are in electrically conducting contact with a conductive bottom 20 of the casing 13 and extend along the width W of the casing 13.

The stack 16 include anode tabs 22 at an upper part 23 of the stack 16, extending along a part of the width W and passing through an aperture in an insulating lower cover member 17, that is placed on the stack 16, below the conductive cover 15. The anode tabs 22 are connected to an anode terminal 24 that is electrically isolated from the cover 15. A cathode terminal 25 is electrically connected to the cover 15.

Electrons that are absorbed in a region 30 of the stack 16 of layer assemblies, will, as schematically indicated by the arrows, travel from the cathode terminal 25, via the cover 15, along the sidewall 26 and the conductive bottom 20 of the casing to the respective cathode tab 18 and pass from the cathode tab 18 upwards to the region 30.

Figure 3:
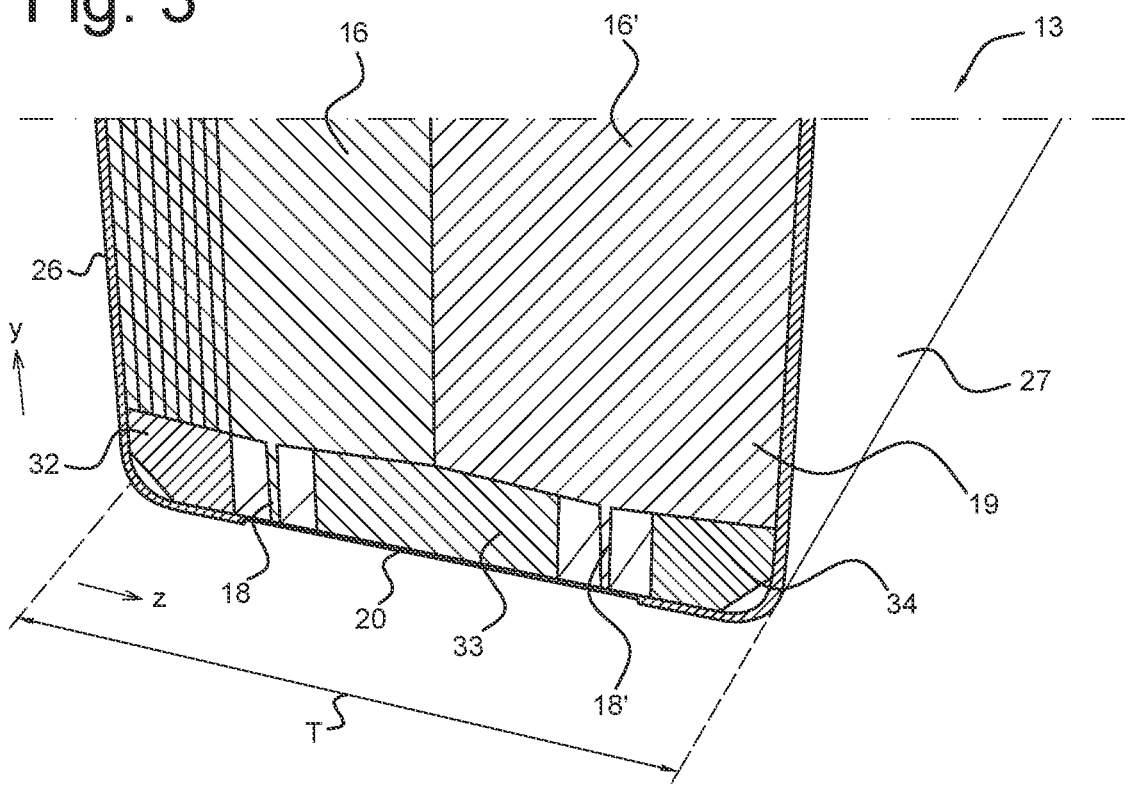
FIG. 3 shows a perspective cross-sectional view of a lower part of a battery cell.

FIG. 3 shows two stacks 16, 16' of electrode and separator layer assemblies that are arranged side by side in the thickness direction z of the casing 13. The cathode tabs 18, 18' of the layers in each stack 16, 16' are fused together and are placed substantially transversely onto the conductive bottom 20. Spacer members 32, 33, 34 support the stacks 16, 16' and are placed on the bottom 20, extending in the width direction x alongside the cathode tabs 18, 18'. The spacer members 32, 33 and 34 can be made of a plastic material.

Figure 4:
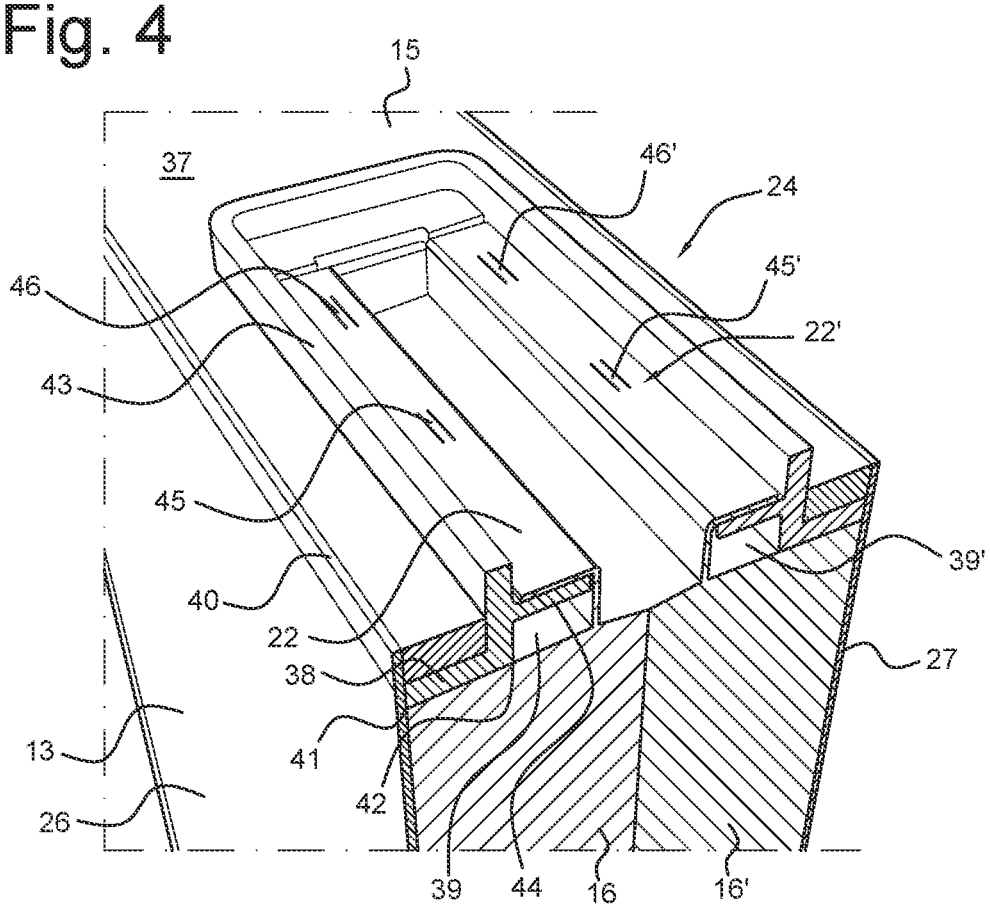
FIG. 4 shows a perspective cross-sectional view of an upper part of a battery cell.

FIG. 4 shows a part of the anode terminal 24 having an isolating support wall 38 that is clamped between the top plane 37 of the cover 15 and an upper sides 39, 39' of the stacks 16, 16'. The cover 15 is laser welded to the side walls 26 of the cell casing, along a weld 40. An inner edge 41 of the support wall 38 abuts against the side wall 26 of the casing 13. At an outer edge 42 of the support wall 41, a circumferential wall 43 extends upwards through a hole in the cover 15. The circumferential wall 43 has a contact surface 44 onto which the anode tabs 22, 22' are welded in a lap joint in weld areas 45, 45', which may be formed by ultrasonic welds. At the weld area's 46, 46', the anode tabs 22, 22' are bonded together by vibration welding or a similar welding technique to form a fused anode tab for each stack 16, 16'.

Figure 5:
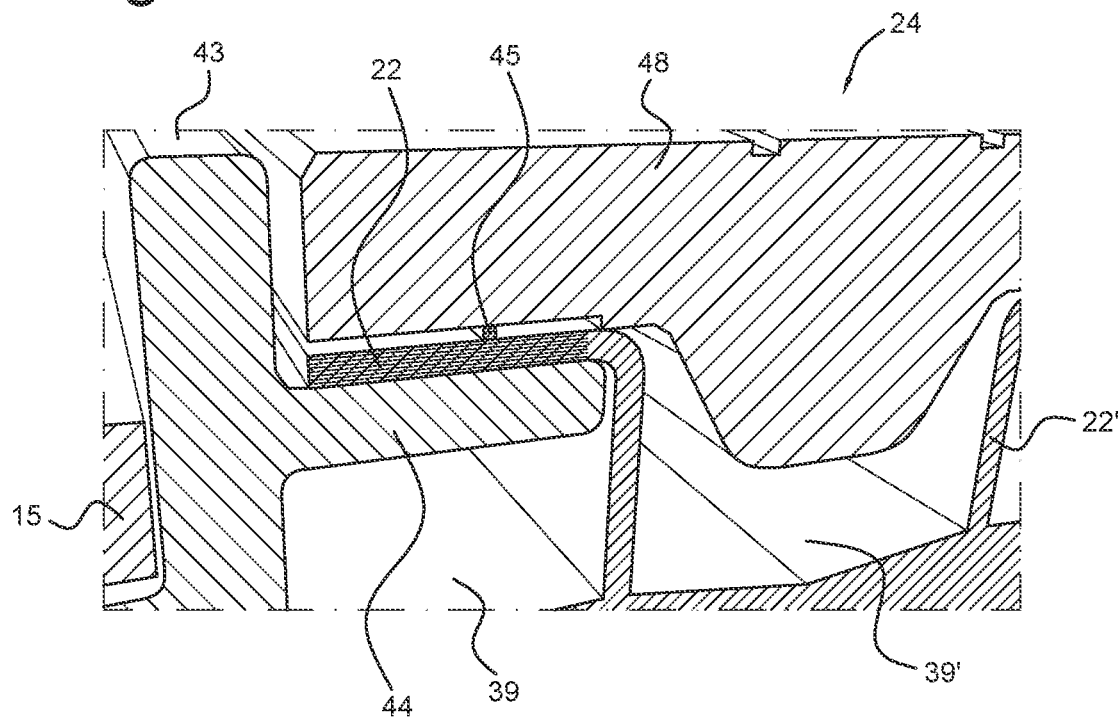
FIG. 5 shows a cross-sectional view of a part of an anode terminal.

FIG. 5 shows a protective terminal cap 48 of conductive material being placed within the upper part of circumferential wall 43 and welded onto the anode tabs 22 in the weld area 45 to complete the anode terminal 24.

Figure 6:
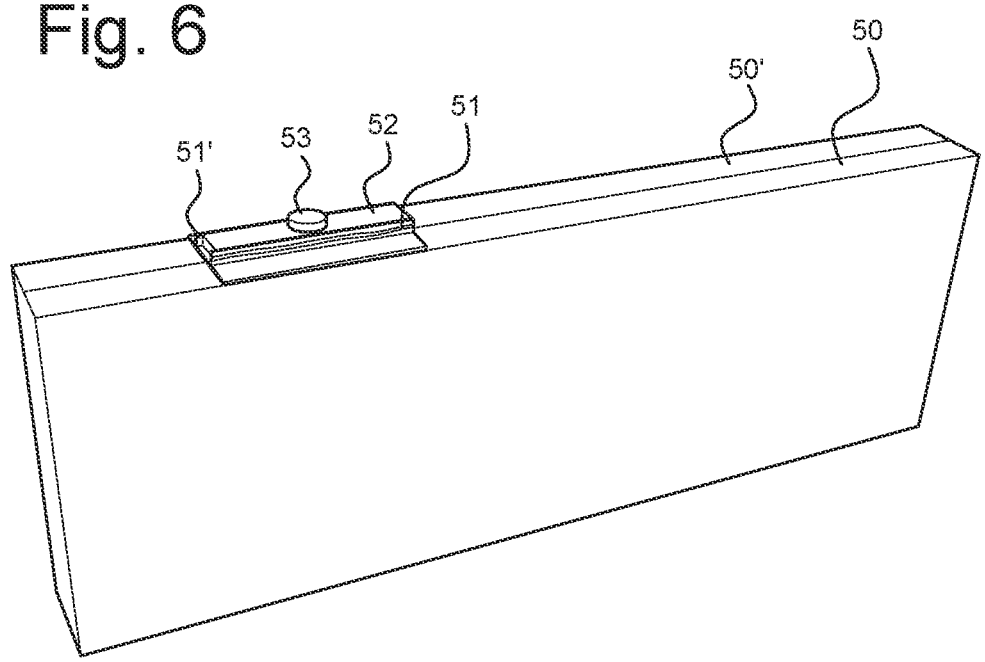
FIG. 6 shows an embodiment of two stacks of electrode and separator sheet assemblies connected to a bus bar member.
Figure 7:
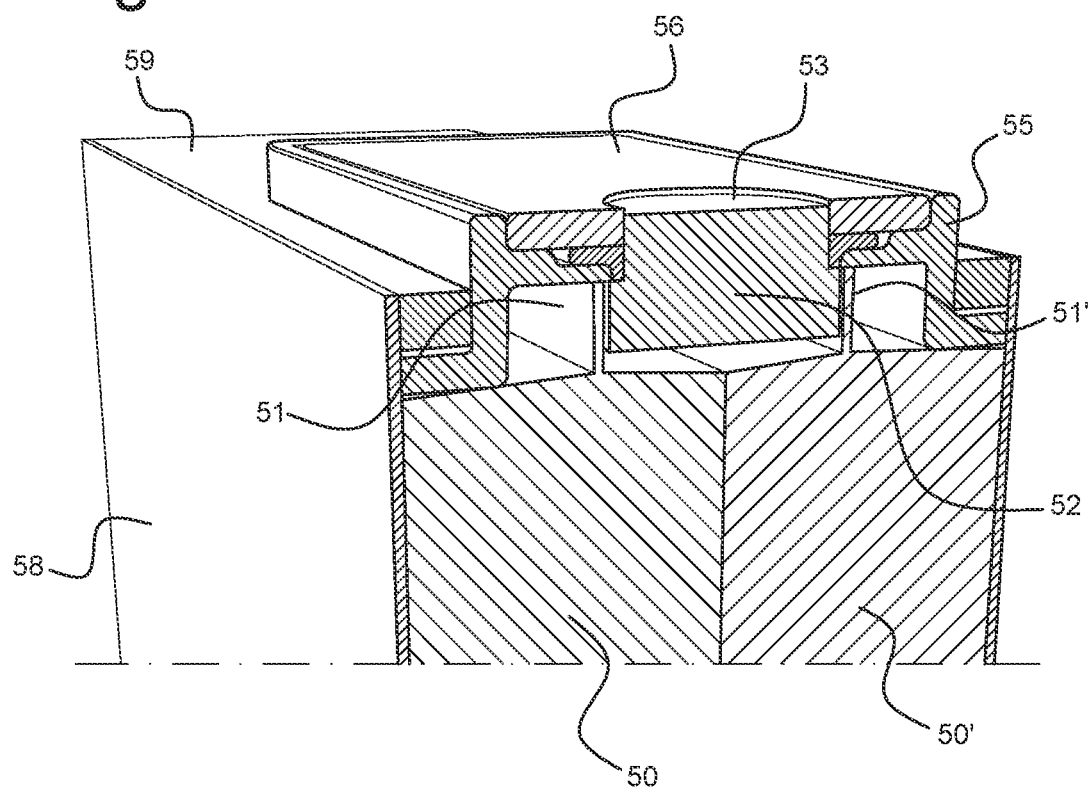
FIG. 7 shows a cross-sectional view of an upper part of a battery cell, including the embodiment of FIG. 6.
Figure 9:
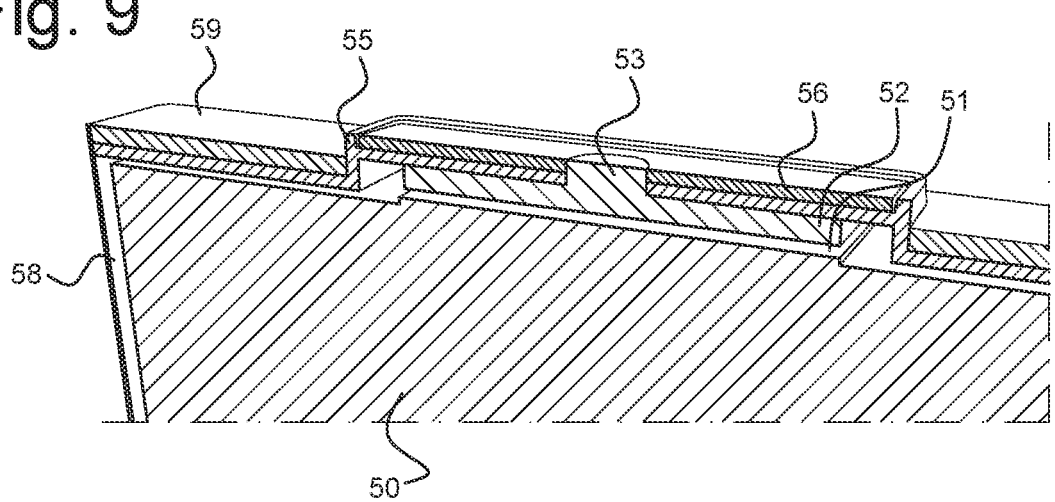
FIG. 9 shows a cross-sectional view of a battery cell 7, including the embodiment of FIG. 6, with the conductive cover in place.

FIG. 6 shows an embodiment in which anode tabs 51, 51' of two stacks 50, 50' of electrode and separator layer assemblies are welded to the perimeter of an elongate bus bar 52. The bus bar 52 may be formed of aluminum or copper and has a cylindrical stub 53 that is received in a tight fit in a cover member 55, that forms an insulator, as shown in FIGS. 7 and 9. The stub 53 is welded to an anode terminal 56.

FIG. 7 shows a cross-sectional view of the tabs 51, 51' extending in the height direction and being welded to the longitudinal sides of the busbar 52. The busbar 52 is conductively connected to the anode terminal 56, that is received in the electrically isolating cover member 55. Conducting cover 59 is welded to the side walls 58 and seals the battery cell.

Figure 8:
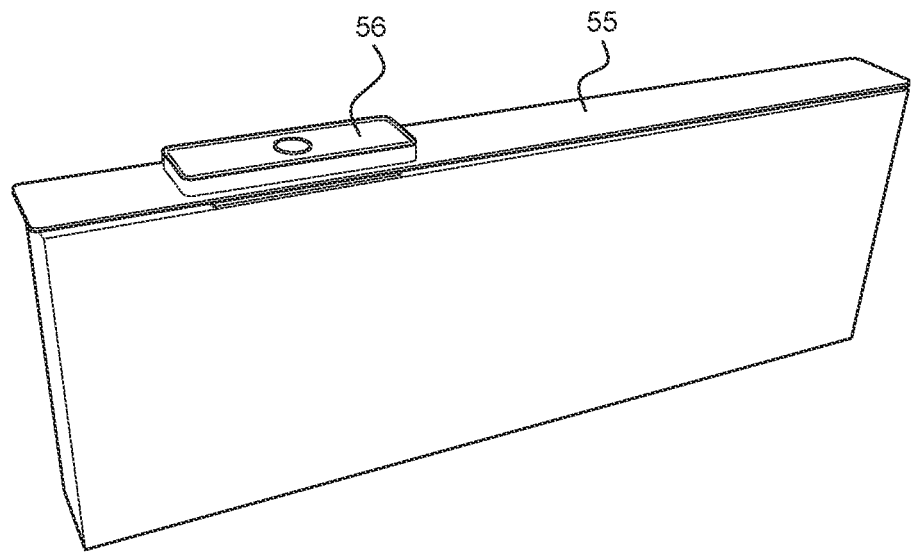
FIG. 8 shows the stacks of FIG. 6 with the anode terminal connected to an insulating cover member.

FIG. 8 shows a perspective view of the cover member 55 and the anode terminal 56, with the cover 59 removed.

Figure 10:
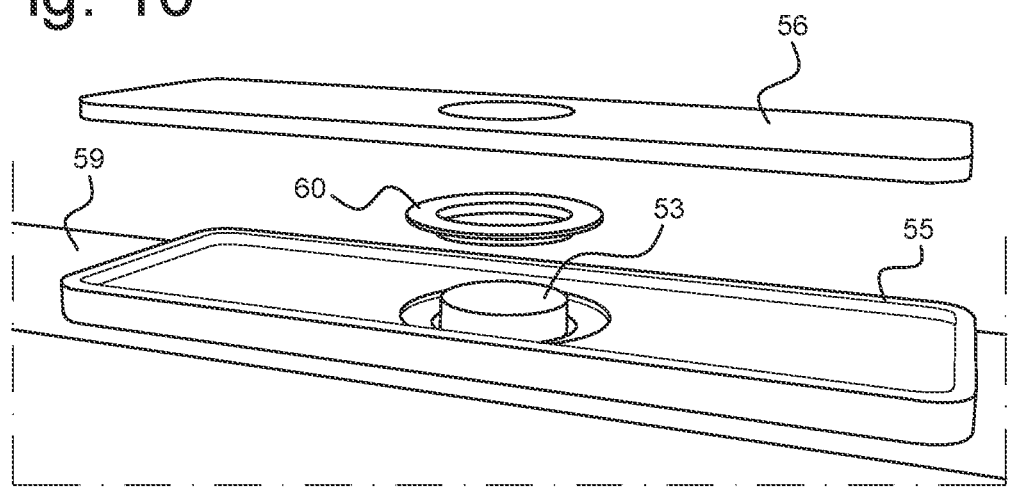
FIG. 10 shows an exploded view of a sealing ring of the anode terminal.

In FIG. 9 it can be seen that the insulating cover member 55 is clamped between the conducting cover 59 of the housing, that is welded onto the cell casing side walls 58. The exploded view of FIG. 10 shows a sealing ring 60 that is placed around the stub 53 and provides a tight seal between the anode terminal 56 and the isolation cover member 55, preventing moisture or contamination from entering the battery cell.

Figure 11:
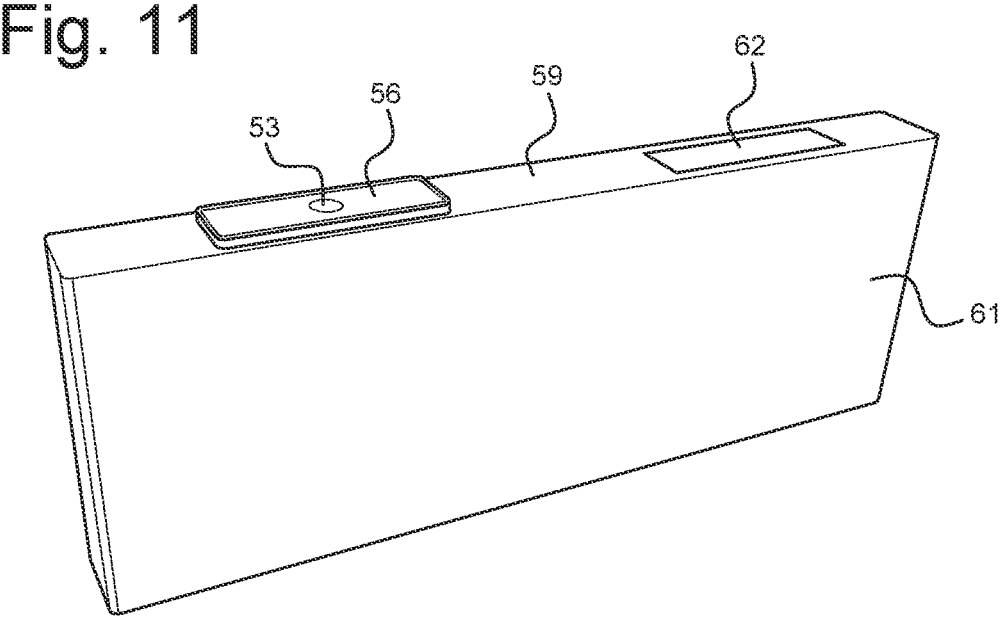
FIG. 11 shows a perspective view the battery cell of FIGS. 7 and 9.

FIG. 11 shows the prismatic battery cell with a rectangular-shaped footprint, with the conductive cover 59 welded to the casing body 61, a cathode terminal 62 embedded in the cover 59 and the anode terminal 56 conductively connected to the anode tabs via the cylindrical stub 53.

The invention claimed is:

1. A battery cell comprising:
a prismatic conductive casing having an electrically conductive casing body with a width (W), a height (H) and a thickness (T) and having a generally rectangular cross-section when seen in the thickness direction (z),
a stack of layer assemblies accommodated in the casing body, each layer assembly comprising a cathode layer, an anode layer and a separator layer there between, the layers extending in a width direction (x) and in a height direction (y) and being of a generally rectangular shape, a stack height extending in the thickness direction (z),
the cathode and anode layers each comprising a cathode tab and an anode tab, respectively,
one of the cathode tabs and anode tabs extending in the width direction (x) along a lower part of the stack of layer assemblies, substantially along the width (W) of the casing and being in conductive contact with a bottom of the casing,
a conductive cover being attached to the casing body and defining a top plane of the battery cell, a first terminal being situated at or near the top plane, conductively connected to the cover,
the other of the cathode tabs and anode tabs extending in the width direction (x) along a section of an upper part of the stack of layer assemblies, and being connected to a conductor, the conductor extending via an opening in the cover to at or near the top plane and connected to the cover via an insulator member, the conductor forming a second terminal associated to the top plane of the cell, and
the anode tabs or cathode tabs being welded to a perimeter of an elongate bus bar member of a conductive material.

2. The battery cell according to claim 1, the cathode tabs extending along the lower part of the stack of layer assemblies, the first terminal forming a cathode terminal, the anode tabs extending along the upper part of the stack of layer assemblies, the conductor comprising an anode conductor and the second terminal forming an anode terminal.

3. The battery cell according to claim 1, a spacer member being placed between a bottom part of the stack of layer assemblies and the bottom of the casing, the spacer member extending in the width direction (x) along the cathode tabs or the anode tabs.

4. The battery cell according to claim 1, two or more stacks of layer assemblies being placed in the casing, side by side in the thickness direction (z), the anode tabs and/or the cathode tabs being fused together to form a fused tab assembly, a spacer member running alongside the fused tab assembly between a bottom part of the stack of layer assemblies and the bottom of the casing.

5. The battery cell according to claim 1, the second terminal comprising a circumferential wall of isolating material, extending in the height direction (y) away from the cover, through a hole in the cover, the circumferential wall having an inner rim with a contact surface in a plane substantially transverse to the height direction (y), onto which plane superposed cathode tabs or anode tabs are welded in a lap joint.

6. The battery cell according to claim 5, wherein the second terminal comprises a support wall situated parallel to the top plane and having an outer edge that abuts against the casing body and an inner edge, the circumferential wall extending in the height direction (y) from the support wall at the inner edge, the cover being welded to the casing body while pressing down onto the support wall.

7. The battery cell according to claim 5, wherein the second terminal comprises a conductive terminal cap that is welded on top of the superposed cathode tabs or anode tabs.

8. The battery cell according to claim 1, the bus bar member having at a top surface a cylindrical part extending in the height direction (y), the cover comprising a hole in its top surface in which an isolating part is situated with an opening placed around the cylindrical part, placed over the bus bar member and having a peripheral rim that positions a cathode or anode conductor.

9. An electric vehicle comprising at least one battery cell according to claim 1.

10. A method of manufacturing a battery cell with a prismatic conductive casing having width (W), a height (Y) and a thickness (Z) and having a generally rectangular cross-section when seen in the thickness direction (z), comprising:
placing a spacer member at a bottom of a casing body,
placing a stack of layer assemblies each comprising a cathode layer, an anode layer and a separator layer there between, the stack comprising cathode tabs and anode tabs and being of a generally rectangular shape, in the casing body, such that the layers extend in a width direction (x) and in a height direction (y), a stack height extending in the thickness direction (z),
placing one of the anode tabs and the cathode tabs that extend along a lower part of the stack of layer assemblies, substantially along the width (W) of the casing, and alongside the spacer member in conductive contact with the bottom, the other of the anode tabs and cathode tabs being situated along an upper part,
welding the tabs at the upper part to a contact member of a terminal,
attaching a conductive cover to the casing body, the cover having an opening through which the contact member projects in the height direction (y), while exerting a compressive force in the height direction (y), clamping the contact member between the cover and the top of the stack of layer assemblies, and
welding a conducting cap onto the tabs at the upper part by exerting a compressive force in the height direction.

11. The method according to claim 10, the contact member comprising a circumferential wall having an inner rim with a contact surface in a plane substantially transverse to the height direction (y), the tabs at the upper part being superposed onto the contact surface and are welded in a lap joint condition by exerting a compressive force on the tabs in the height direction (y).

12. A battery cell comprising:
a prismatic conductive casing having an electrically conductive casing body with a width (W), a height (H) and a thickness (T) and having a generally rectangular cross-section when seen in the thickness direction (z), a stack of layer assemblies accommodated in the casing body, each layer assembly comprising a cathode layer, an anode layer and a separator layer there between, the layers extending in a width direction (x) and in a height direction (y) and being of a generally rectangular shape, a stack height extending in the thickness direction (z), the cathode and anode layers each comprising a cathode tab and an anode tab, respectively, one of the cathode tabs and anode tabs extending in the width direction (x) along a lower part of the stack of layer assemblies, substantially along the width (W) of the casing and being in conductive contact with a bottom of the casing, a conductive cover being attached to the casing body and defining a top plane of the battery cell, a first terminal being situated at or near the top plane, conductively connected to the cover, the other of the cathode tabs and anode tabs extending in the width direction (x) along a section of an upper part of the stack of layer assemblies, and being connected to a conductor, the conductor extending via an opening in the cover to at or near the top plane and connected to the cover via an insulator member, the conductor forming a second terminal associated to the top plane of the cell, and the second terminal comprising a circumferential wall of isolating material, extending in the height direction (y) away from the cover, through a hole in the cover, the circumferential wall having an inner rim with a contact surface in a plane substantially transverse to the height direction (y), onto which plane superposed cathode tabs or anode tabs are welded in a lap joint, wherein the second terminal comprises a support wall situated parallel to the top plane and having an outer edge that abuts against the casing body and in inner edge, the circumferential wall extending in the height direction (y) from the support wall at the inner edge, the cover being welded to the casing body while pressing down onto the support wall.

13. The battery cell according to claim 12, the cathode tabs extending along the lower part of the stack of layer assemblies, the first terminal forming a cathode terminal, the anode tabs extending along the upper part of the stack of layer assemblies, the conductor comprising an anode conductor and the second terminal forming an anode terminal.

14. The battery cell according to claim 12, a spacer member being placed between a bottom part of the stack of layer assemblies and the bottom of the casing, the spacer member extending in the width direction (x) along the cathode tabs or the anode tabs.

15. The battery cell according to claim 12, two or more stacks of layer assemblies being placed in the casing, side by side in the thickness direction (z), the anode tabs and/or the cathode tabs being fused together to form a fused tab assembly, a spacer member running alongside each fused tab assembly between a bottom part of the stack of layer assemblies and the bottom of the casing.

16. The battery cell according to claim 12, wherein the second terminal comprises a conductive terminal cap that is welded on top of the superposed cathode tabs or anode tabs.

17. The battery cell according to claim 12, the anode tabs or cathode tabs being welded to a perimeter of an elongate bus bar member of a conductive material.

18. The battery cell according to claim 17, the bus bar member having at a top surface a cylindrical part extending in the height direction (y), the cover comprising a hole in its top surface in which an isolating part is situated with an opening placed around the cylindrical part, placed over the bus bar member and having a peripheral rim that positions a cathode or anode conductor.

19. An electric vehicle comprising at least one battery cell according to claim 12.

\* \* \* \* \*